(12) United States Patent
Tanaka et al.

(10) Patent No.: US 11,380,301 B2
(45) Date of Patent: Jul. 5, 2022

(54) LEARNING APPARATUS, SPEECH RECOGNITION RANK ESTIMATING APPARATUS, METHODS THEREOF, AND PROGRAM

(71) Applicant: NIPPON TELEGRAPH AND TELEPHONE CORPORATION, Chiyoda-ku (JP)

(72) Inventors: Tomohiro Tanaka, Yokosuka (JP); Ryo Masumura, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 1 day.

(21) Appl. No.: 16/970,798

(22) PCT Filed: Feb. 18, 2019

(86) PCT No.: PCT/JP2019/005882
§ 371 (c)(1),
(2) Date: Aug. 18, 2020

(87) PCT Pub. No.: WO2019/163718
PCT Pub. Date: Aug. 29, 2019

(65) Prior Publication Data
US 2021/0090552 A1    Mar. 25, 2021

(30) Foreign Application Priority Data
Feb. 21, 2018  (JP) .............................. JP2018-029076

(51) Int. Cl.
*G10L 15/01*    (2013.01)
*G06N 3/08*    (2006.01)
(Continued)

(52) U.S. Cl.
CPC ................ *G10L 15/01* (2013.01); *G06N 3/08* (2013.01); *G10L 15/16* (2013.01); *G10L 25/30* (2013.01)

(58) Field of Classification Search
CPC ......... G10L 15/01; G10L 15/16; G10L 25/30; G06N 3/08
(Continued)

(56) References Cited

U.S. PATENT DOCUMENTS

| 2018/0096678 | A1* | 4/2018 | Zhou | ..................... G10L 15/22 |
| 2018/0158456 | A1* | 6/2018 | Lee | .......................... G10L 15/22 |
| 2018/0277143 | A1* | 9/2018 | Song | ..................... G10L 15/063 |

FOREIGN PATENT DOCUMENTS

| JP | 2014-224860 A |   | 12/2014 |
| KR | 20120052591 A | * | 5/2012 |
| KR | 20120052591 A | * | 5/2012 |

OTHER PUBLICATIONS

B. Li, F. Chang, J. Guo and G. Liu, "Speech Recognition error correction by using combinational measures," 2012 3rd IEEE International Conference on Network Infrastructure and Digital Content, 2012, pp. 375-379, doi: 10.1109/ICNIDC.2012.6418778. (Year: 2012).*

(Continued)

*Primary Examiner* — Bharatkumar S Shah
(74) *Attorney, Agent, or Firm* — Oblon, McClelland, Maier & Neustadt, L.L.P.

(57) ABSTRACT

A learning apparatus comprises a learning part that learns an error correction model by a set of a speech recognition result candidate and a correct text of speech recognition for given audio data, wherein the speech recognition result candidate includes a speech recognition result candidate which is different from the correct text, and the error correction model is a model that receives a word sequence of the speech recognition result candidate as input and outputs an
(Continued)

error correction score indicating likelihood of the word sequence of the speech recognition result candidate in consideration of a speech recognition error.

9 Claims, 5 Drawing Sheets

(51) Int. Cl.
*G10L 15/16* (2006.01)
*G10L 25/30* (2013.01)

(58) Field of Classification Search
USPC .......................................................... 704/231
See application file for complete search history.

(56) References Cited

OTHER PUBLICATIONS

L. Mangu and M. Padmanabhan, "Error corrective mechanisms for speech recognition," 2001 IEEE International Conference on Acoustics, Speech, and Signal Processing. Proceedings (Cat. No. 01CH37221), 2001, pp. 29-32 vol.1, doi: 10.1109/ICASSP.2001.940759. (Year: 2001).*

B. Li, F. Chang, J. Guo and G. Liu, "Speech Recognition error correction by using combinational measures," 2012 3rd IEEE International Conference on Network Infrastructure and Digital Content, 2012, pp. 375-379, doi: 10.1109/ICNIDC.2012.6418778. (Year: 2012) (Year: 2012).*

L. Mangu and M. Padmanabhan, "Error corrective mechanisms for soeech recognition," 2001 IEEE International Conference on Acoustics, Speech, and Signal Processing. Proceedings (Cat. No. 01CH37221), 2001, pp. 29-32 vol.1, doi: 10.1109/ICASSP.2001.940759. (Year: 2001) (Year: 2001).*

International Search Report dated May 14, 2019 in PCT/JP2019/005882 filed Feb. 18, 2019, 2 pages.

Mikolov et al., "Recurrent neural network based language model", In Proc. INTERSPEECH, 2010, pp. 1045-1048.

Sutskever et al., "Sequence to Sequence Learning with Neural Networks", In Proc. NIPS, 2014, pp. 3104-3112 (pp. 1-9).

Luong et al., "Effective Approaches to Attention-based Neural Machine Translation", In Proc. EMNLP, 2015, pp. 1412-1421.

* cited by examiner

LEARNING APPARATUS, SPEECH RECOGNITION RANK ESTIMATING APPARATUS, METHODS THEREOF, AND PROGRAM

TECHNICAL FIELD

The present invention relates to a technique for correcting errors in recognition results obtained by speech recognition.

BACKGROUND ART

In speech recognition systems, it is known that the accuracy of speech recognition is improved by re-ranking a plurality of candidates for a recognition result (hereinafter also referred to as speech recognition result candidates) obtained in a recognition process. In particular, re-ranking using a Recurrent Neural Network (RNN) language model is widely known (see Non-patent literature 1). An RNN is a well-known technology and its description will be omitted here. In the RNN language model, words to be input are converted into a fixed-length vector composed of continuous values and are input into the RNN, and the obtained fixed-length vector is input into a discriminant function to calculate occurrence probabilities of next appearing words. When an input word sequence is represented as $\{w_1, w_2, \ldots, w_T\}$, the occurrence probability of a word $w_{t+1}$ (where, $t=1, 2, \ldots, T$) in the sequence is estimated as follows.

$E_t = \text{EMBEDDING}(w_t)$
$h_t = \text{RNN}(E_t)$
$O_{t+1} = \text{DISTRIBUTE}(h_t)$ Here, $E_t$ denotes a word distributed representation of a word $w_t$. Note that the word distributed representation is a word expressed by a high-dimensional real number vector (word vector). For example, it is a vector that has dimensions corresponding to all words included in a corpus or the like, with a value of a dimension corresponding to a word to be expressed being 1 and values of the other dimensions being 0. In addition, $h_t$ denotes a fixed-length vector composed of continuous values obtained by converting the word distributed representation sequence $E_t$ by the RNN. Further, $O_{t+1}$ denotes a vector including occurrence probabilities of all words included in a corpus or the like, and a vector in which the occurrence probabilities corresponding to the respective words are values of the respective dimensions. EMBEDDING ( ) is a function that has functional capability of converting words into word distributed representations (word vectors), RNN ( ) is a function that has functional capability of the RNN, and DISTRIBUTE ( ) is a function that calculates the occurrence probabilities of all words from the fixed-length vector. A function of linear conversion can be used for EMBEDDING ( ) and a softmax function can be used for DISTRIBUTE ( ). Since the softmax function is a well-known technique, its description will be omitted here. In $O_{t+1}$ calculated in the above, a value of the dimension corresponding to the word $w_{t+1}$ is assumed to be the occurrence probability of the word $w_{t+1}$. Refer to Non-patent literature 1 for details of each process.

When re-ranking recognition results of speech recognition by using the RNN language model, N speech recognition result candidates ranked higher among recognition results obtained in the speech recognition process are input into the RNN language model, and occurrence probabilities for the all words of each of the speech recognition result candidates are calculated. Here, N is any integer of two or more. A score of the RNN language model is calculated from the obtained occurrence probabilities and combined with a score obtained by the speech recognition in the previous stage to determine scores of the N speech recognition result candidates, and the ranking of each speech recognition result candidate is determined according to the scores.

PRIOR ART LITERATURE

Non-Patent Literature

Non-patent literature 1: Tomas Mikolov, Martin Karafiat, Lukas Burget, Jan Cernocky, Sanjeev Khudanpur, "Recurrent Neural Network Based Language Model", In Proc. INTERSPEECH, pp. 1045-1048, 2010.

SUMMARY OF THE INVENTION

Problems to be Solved by the Invention

However, in the case of the conventional technique using the RNN language model, although modeling is performed in consideration of context, speech recognition errors cannot be considered.

It is possible to further improve recognition accuracy by modeling that takes speech recognition errors into consideration. Therefore, an objective of the present invention is to provide a learning apparatus of a model that considers speech recognition errors, a speech recognition rank estimating apparatus using the model, methods thereof, and a program.

Means to Solve the Problems

In order to solve the above problem, according to one aspect of the present invention, a learning apparatus comprises a learning part that learns an error correction model by a set of a speech recognition result candidate and a correct text of speech recognition for given audio data, wherein the speech recognition result candidate includes a speech recognition result candidate which is different from the correct text, and the error correction model is a model that receives a word sequence of the speech recognition result candidate as input and outputs an error correction score indicating likelihood of the word sequence of the speech recognition result candidate in consideration of a speech recognition error.

In order to solve the above problem, according to another aspect of the present invention, a learning method comprises a learning step in which a learning part learns an error correction model by a set of a speech recognition result candidate and a correct text of speech recognition for given audio data, wherein the speech recognition result candidate includes a speech recognition result candidate which is different from the correct text, and the error correction model is a model that receives a word sequence of the speech recognition result candidate as input and outputs an error correction score indicating likelihood of the word sequence of the speech recognition result candidate in consideration of a speech recognition error.

Effects of the Invention

According to the present invention, modeling that takes speech recognition errors into consideration becomes possible. In addition, by using a model that takes speech recognition errors into consideration, it becomes possible to re-rank speech recognition result candidates in consideration of speech recognition errors, which achieves an effect of being able to obtain a recognition result with higher recognition accuracy.

DETAILED DESCRIPTION OF THE EMBODIMENTS

Hereinafter, an embodiment of the present invention will be described. Note that in the drawings used in the following description, components having the same functions and steps of performing the same processing are denoted by the same reference numerals, and redundant description will be omitted. In the following description, a process performed in units of each element of a vector or a matrix is applied to all elements of the vector or the matrix unless otherwise specified.

<Point of First Embodiment>

The present invention employs a frame of handling speech recognition errors by a Sequence-to-Sequence (Seq2Seq) model (see Reference literature 1) in the above-described re-ranking using the RNN language model.

(Reference literature 1) Ilya Sutskever, Oriol Vinyals, Quoc V. Le, "Sequence to Sequence Learning with Neural Networks", In Proc. NIPS, pp. 3104-3112, 2014.

The Seq2Seq model is a model that can receive variable-length sequence information and output a variable-length sequence. Sequence length of a word sequence including a speech recognition error is different from sequence length of a word sequence including no speech recognition error. The Seq2Seq model makes it possible to handle the two sequences having different sequence lengths. In addition, an attention mechanism (Reference literature 2) can also be used as one of Seq2Seq structures. (Reference literature 2) Minh-Thang Luong, Hieu Pham, Christopher D. Manning, "Effective Approaches to Attention-based Neural Machine Translation", In Proc. EMNLP, pp. 1412-1421, 2015.

In the conventional RNN language model, a model is learned by using a word sequence that does not include speech recognition errors. On the other hand, in the embodiment, modeling of speech recognition errors is made possible by inputting a word sequence of a speech recognition result candidate including a speech recognition error and a word sequence of a correct text including no speech recognition error, and learning by targeting the correct text.

First Embodiment

Figure 1:
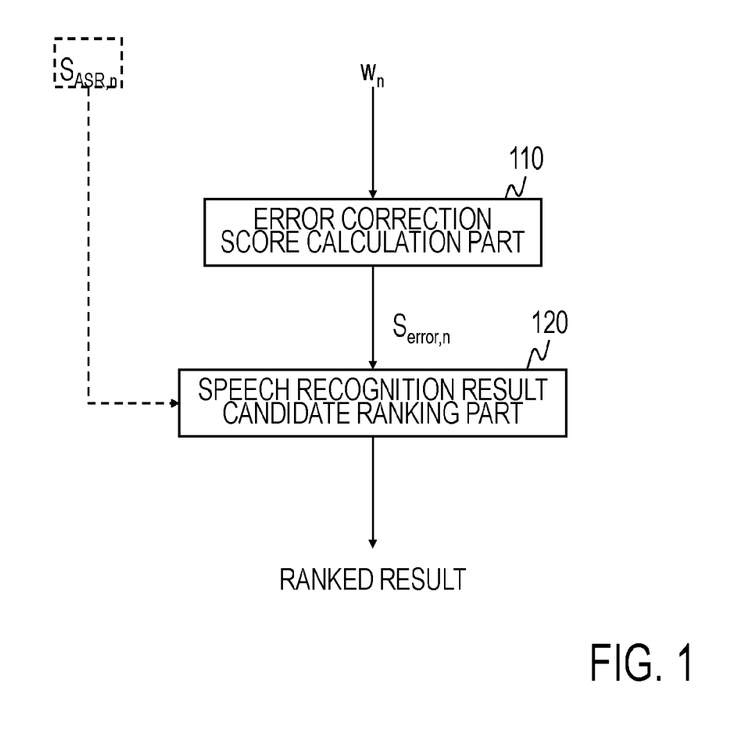
FIG. 1 is a functional block diagram of a speech recognition rank estimating apparatus according to a first embodiment.
Figure 2:
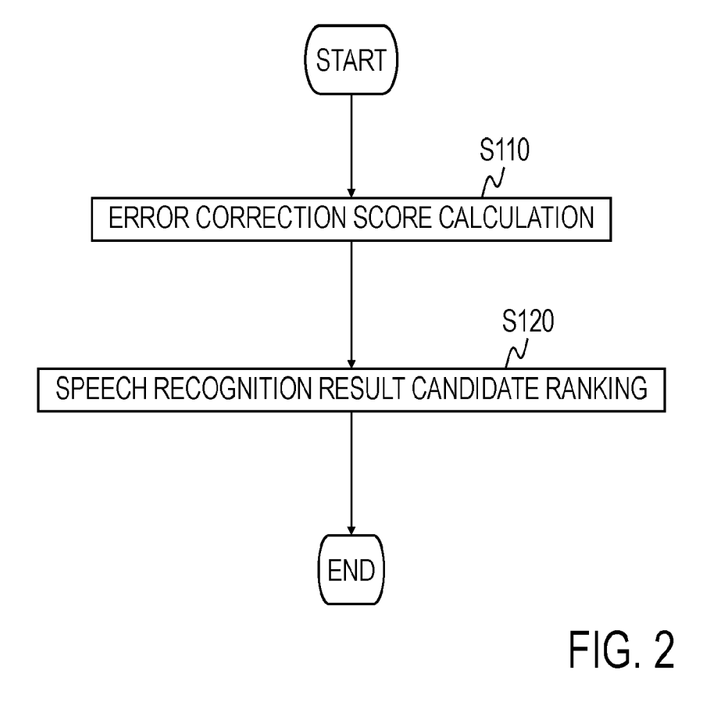
FIG. 2 is a diagram showing an example of a processing flow of the speech recognition rank estimating apparatus according to the first embodiment.

FIG. 1 shows a functional block diagram of a speech recognition rank estimating apparatus 100 according to a first embodiment, and FIG. 2 shows its processing flow.

The speech recognition rank estimating apparatus 100 includes an error correction score calculation part 110 and a speech recognition result candidate ranking part 120.

The speech recognition rank estimating apparatus 100 receives word sequences of N speech recognition result candidates as input, ranks the N speech recognition result candidates, and outputs its results. Here, N is any integer of two or more. As a result of ranking, a set of the N speech recognition result candidates and rankings of the respective speech recognition result candidates may be output, or M speech recognition result candidates ranked higher among the N speech recognition result candidates may be output in descending order or in ascending order (in this case, the order of output corresponds to ranking). In short, an appropriate value should be output according to what kind of processing is performed in a subsequent stage of the speech recognition rank estimating apparatus 100. For example, when a speech recognition result is output, M=1 is set, and the highest ranked speech recognition result candidate should be output as the speech recognition result. In this embodiment, the N speech recognition result candidates which are rearranged in ascending order based on rankings of the respective speech recognition result candidates are assumed to be output.

The speech recognition rank estimating apparatus is a special apparatus in which a special program is read into a known or dedicated computer including, for example, a central processing unit (CPU) and a main storage apparatus (RAM: Random Access Memory). The speech recognition rank estimating apparatus performs each process, for example, under control of the central processing unit. Data input into the speech recognition rank estimating apparatus or data obtained in each process is stored in, for example, the main storage apparatus, and the data stored in the main storage apparatus is read out to the central processing unit and used for another process as needed. At least a part of each processing part of the speech recognition rank estimating apparatus may be made of hardware such as an integrated circuit. Each storage part included in the speech recognition rank estimating apparatus can be composed of, for example, a main storage apparatus such as a RANI (Random Access Memory) or middleware such as a relational database or a key-value store. However, each storage part does not necessarily need to be provided inside the speech recognition rank estimating apparatus, and may be composed of an auxiliary storage apparatus composed of a hard disk, an optical disk, or a semiconductor memory element like a flash memory and provided outside the speech recognition rank estimating apparatus.

Hereinafter, each part will be described.

<Error Correction Score Calculation Part 110>

Input: word sequences $w_n$ of the N speech recognition result candidates

Output: N error correction scores $S_{error,n}$

The error correction score calculation part 110 finds, from the word sequences $w_n$ of the N speech recognition result candidates, word distributed representation sequences for word sequences of speech recognition result candidates and distributed representations of the speech recognition result candidates, inputs the found word distributed representation sequences and distributed representations into the error correction model, and obtains N error correction scores $S_{error,n}$ for the respective word sequences of the speech recognition result candidates which are outputs of the error correction model (S110). Note that it is assumed that n=1, 2, . . . , N, the word sequence of an n-th speech recognition result candidate includes $T_n$ words and represented as a word sequence $w_n = \{w_{n,1}, w_{n,2}, \ldots, w_{n,T\_n}\}$, t=1, 2, . . . , $T_n$, and $w_{n,t}$ is a t-th word included in the word sequence $w_n$ of the n-th speech recognition result candidate. A subscript A_B means $A_B$. The error correction model is a model that receives the word sequence of a speech recognition result candidate as input and outputs a correction score. The error correction score indicates likelihood of the word sequence of the input speech recognition result candidate in consideration of a speech recognition error. A method for calculating the error correction score will be detailed later.

<Speech Recognition Result Candidate Ranking Part 120>
Input: the N error correction scores $S_{error,n}$ (N speech recognition scores $S_{ASR,n}$ according to need)
Output: N speech recognition result candidates rearranged in ascending order on the basis of rankings of the respective speech recognition result candidates The speech recognition result candidate ranking part 120 uses the N error correction scores $S_{error,n}$ to rank the speech recognition result candidates (S120), and outputs ranked results. For example, (1) To use the N error correction scores $S_{error,n}$ to rank the speech recognition result candidates. For example, the higher an error correction score $S_{error,n}$ is, the higher it is ranked.

(2) To use the N error correction scores $S_{error,n}$ and the N speech recognition scores $S_{ASR,n}$ to find new scores and to use the new scores $S_{new,n}$ to rank the speech recognition result candidates. For example, the higher a score $S_{new,n}$ is, the higher it is ranked. For example, the score $S_{new,n}$ is calculated as follows.

$$S_{new,n} 32 (1-\lambda) S_{ASR,n} + \lambda S_{error,n}$$

Here, $\lambda$ denotes weight of the error correction score $S_{error,n}$ and is $0 < \lambda \leq 1$. When $\lambda=1$, it becomes the same ranking as the above-described (1), so (1) can be said to be an example of (2). Note that for the N speech recognition scores $S_{ASR,n}$, the values calculated when the speech recognition result candidates are obtained may be used. In the embodiment, ranking is assumed to be performed by the method of (2). Consequently, the speech recognition rank estimating apparatus 100 according to the embodiment receives the N speech recognition scores $S_{ASR,n}$ together with the word sequences $w_n$ of the N speech recognition result candidates.

<Detail of Error Correction Score Calculation Part 110>

Figure 3:
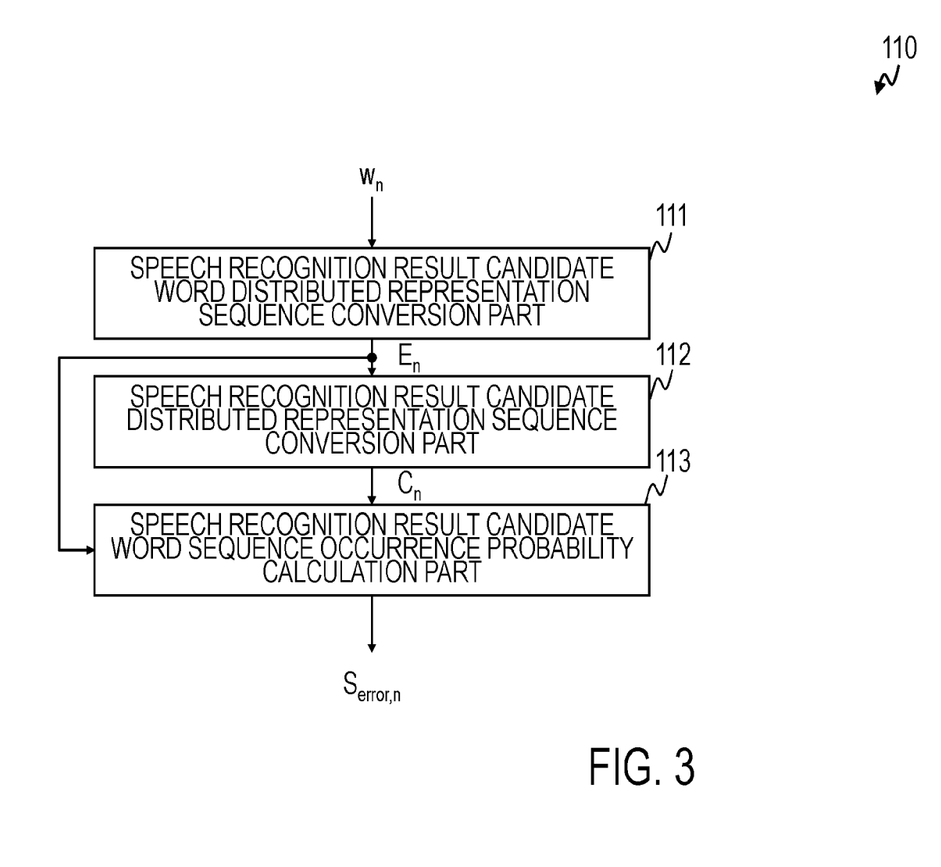
FIG. 3 is a functional block diagram of an error correction score calculation part.

FIG. 3 shows a functional block diagram of the error correction score calculation part 110.

The error correction score calculation part 110 includes a speech recognition result candidate word distributed representation sequence conversion part 111, a speech recognition result candidate distributed representation sequence conversion part 112, and a speech recognition result candidate word sequence occurrence probability calculation part 113.

The error correction score calculation part 110 converts the word sequences $w_n$ of the N speech recognition result candidates obtained in the speech recognition process into distributed representations of the speech recognition result candidates. First, it converts each word $w_{n,1}$ of the word sequence $w_n$ of a speech recognition result candidate into a distributed representation, and a sequence of the distributed representations converted into one distributed representation is assumed to be the distributed representation of the speech recognition result candidate.

Hereinafter, processing contents of each part will be described. (Speech recognition result candidate word distributed representation sequence conversion part 111)
Input: the word sequences $w_n$ of the N speech recognition result candidates
Output: word distributed representation sequences $E_n$ of the N speech recognition result candidates The speech recognition result candidate word distributed representation sequence conversion part 111 calculates the word distributed representation of the speech recognition result candidate of the t-th word $w_{n,t}$ in the n-th word sequence $w_n$ of the N speech recognition result candidates as follows.

$$E_{n,t} = \text{EMBEDDING}(w_{n,t})$$

Here, $E_{n,t}$ denotes the distributed representation of the word $w_{n,t}$, and EMBEDDING ( ) represents linear conversion. The same processing is performed for all the words $w_{n,t}$ in the speech recognition result candidate word sequence $w_n$. Note that the word distributed representation sequence composed of $T_n$ word distributed representations $E_{n,t}$ is represented as $E_n = \{E_{n,1}, E_{n,2}, \ldots, E_{n,T_n}\}$.

The above processing is performed for the word sequences $w_n$ of the N speech recognition result candidates, and word distributed representation sequences $E_n$ of the N speech recognition result candidates are obtained.

(Speech Recognition Result Candidate Distributed Representation Sequence Conversion Part 112)
Input: the word distributed representation sequences $E_n$ of the N speech recognition result candidates
Output: distributed representations $C_n$ of the N speech recognition result candidates The speech recognition result candidate distributed representation sequence conversion part 112 converts the word distributed representation sequence $E_n$ composed of the $T_n$ word distributed representations $E_{n,t}$ obtained by the speech recognition result candidate word distributed representation sequence conversion part 111 into one distributed representation $C_n$. The distributed representation of the speech recognition result candidate is calculated as follows.

$$C_n = \text{RNN}(E_{n,1}, E_{n,2}, \ldots, E_{n,T_n})$$

Here, $C_n$ denotes a continuous value vector obtained by converting the word sequence $w_n$ of the speech recognition result candidate by the RNN. In addition, RNN ( ) is a function that has functional capability of converting the sequence of a variable-length vector into a continuous value vector.

The above processing is performed for the word distributed representation sequences $E_n$ of the N speech recognition result candidates, and the distributed representations $C_n$ of the N speech recognition result candidates are obtained.

(Speech Recognition Result Candidate Word Sequence Occurrence Probability Calculation Part 113)
Input: the word distributed representation sequences $E_n$ of the N speech recognition result candidates, and the distributed representations $C_n$ of the N speech recognition result candidates
Output: N error correction scores $S_{error,n}$ The speech recognition result candidate word sequence occurrence probability calculation part 113 uses the word distributed representation sequences $E_n$ of the N speech recognition result candidates and the distributed representations $C_n$ of the N speech recognition result candidates, inputs these values to the error correction model, and calculates error correction scores $S_{error,n}$ of the N speech recognition result candidates. First, the speech recognition result candidate word sequence occurrence probability calculation part 113 calculates an occurrence probability of the word $w_{n,t}$ in the word sequence $w_n$ of the speech recognition result candidate. The occurrence probability of the word $w_{n,t+1}$ in the word sequence of the speech recognition result candidate is calculated as follows.

$$h_{n,t} = \text{RNN}(E_{n,t}, C_n)$$
$$O_{n,t+1} = \text{DISTRIBUTE}(h_{n,t})$$

Here, $h_{n,t}$ denotes a vector composed of continuous values. In addition, $O_{n,t+1}$ denotes a vector including occurrence probabilities of all target words (for example, all words contained in a corpus), and is a vector having the occurrence probability corresponding to each word as the value of each dimension. RNN ( ) is a function having functional capability of converting a continuous value vector sequence into a fixed-length continuous value vector, and any function having the functional capability can be used. For example, the RNN (Recurrent Neural Network) can be used. Refer to Non-patent literature 1 for details of the functional capability of the RNN as described above. DISTRIBUTE ( ) is a function of calculating occurrence probabilities of all words from a fixed-length vector, and, for example, the softmax function can be used. The softmax function is a well-known technique and its description will be omitted here. The occurrence probability of the word $w_{n,t+1}$ is a value corresponding to the word $w_{n,t+1}$ of $O_{n,t+1}$. The occurrence probability of each word $w_{n,t}$ in the word sequence $w_n$ of the speech recognition result candidate is found, and the total product of $T_n$ occurrence probabilities is set as the error correction score $S_{error,n}$ of the word sequence $w_n$.

The speech recognition result candidate word sequence occurrence probability calculation part 113 performs the above for the N word sequences $w_n$ to find N error correction scores $S_{error,n}$.

Figure 4:
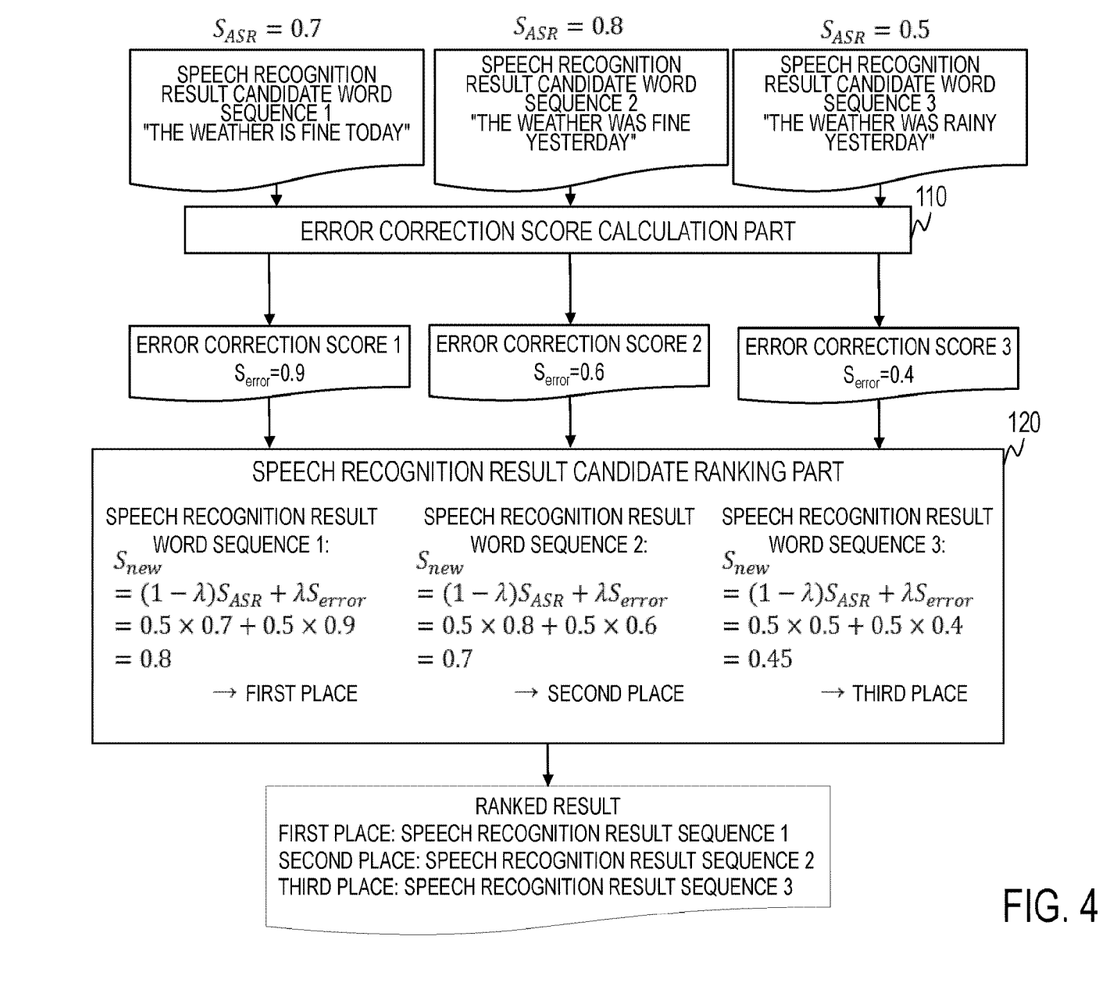
FIG. 4 is a diagram showing an example of a processing result when N=3.

FIG. 4 shows an example of a processing result when N=3 in the speech recognition rank estimating apparatus 100.

Effect

By using ranked results obtained like this, re-ranking of speech recognition result candidates in consideration of speech recognition errors is made possible and recognition results having higher recognition accuracy can be obtained.
<Learning Method>

Hereinafter, a method for learning the error correction model will be described.

Figure 5:
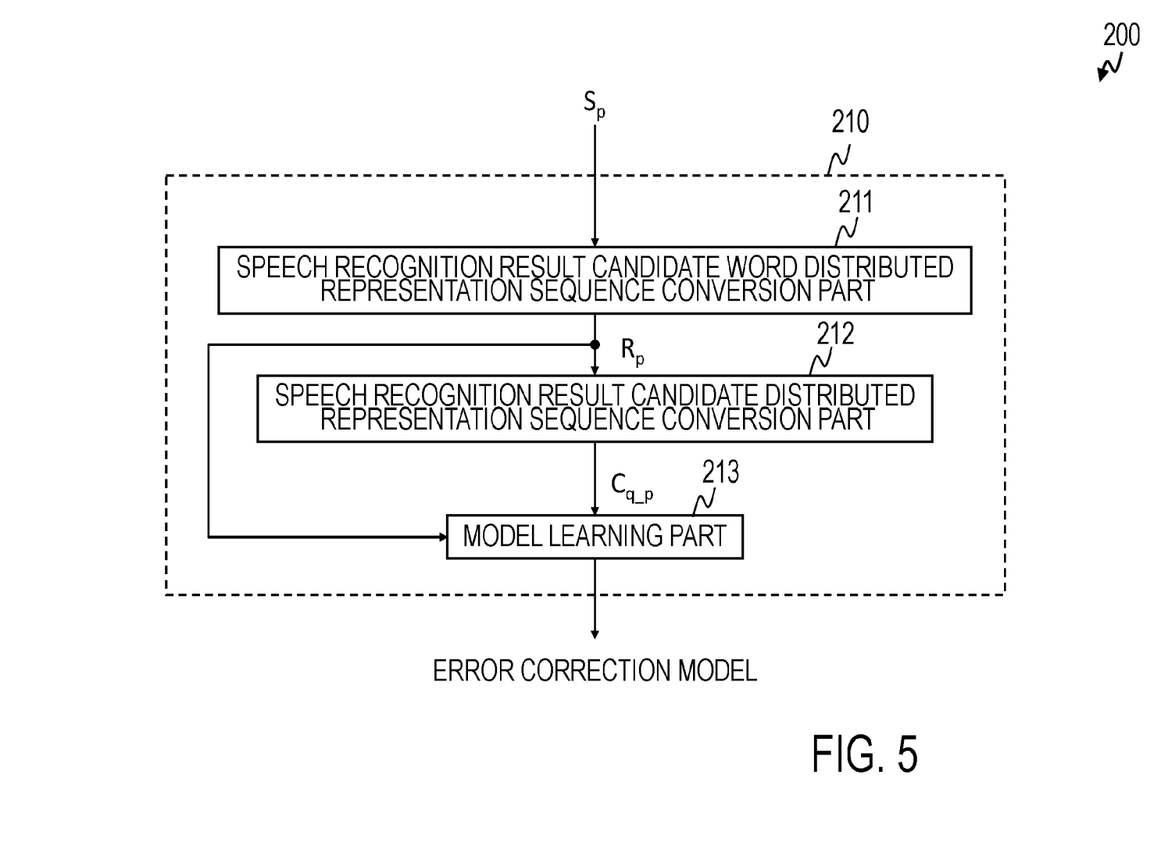
FIG. 5 is a functional block diagram of a learning apparatus according to the first embodiment.

A learning apparatus 200 includes a learning part 210. FIG. 5 shows a functional block diagram of the learning apparatus 200.
<Learning Part 210>
Input: P sets of word sequences of learning speech recognition result candidates and a word sequence of the correct text
Output: an error correction model The learning part 210 uses the P sets of word sequences of learning speech recognition result candidates and the word sequence of the correct text to learn the error correction model. It is assumed that p=1, 2, . . . , P, a p-th set is denoted by $S_p$, and the set $S_p$ includes word sequences of $Q_p$ learning speech recognition result candidates and a word sequence of one correct text. Note that $Q_p$ is any integer of one or more. The word sequences of the $Q_p$ learning speech recognition result candidates include the word sequence of a learning speech recognition result candidate different from the word sequence of the correct text. In addition, the word sequences of the $Q_p$ learning speech recognition result candidates may or may not include the same word sequence as that of the correct text. It is assumed that $q_p$=1, 2, . . . , $Q_p$, and the word sequence of a $q_p$-th learning speech recognition result candidate in the word sequences of the $Q_p$ learning speech recognition result candidates included in the set $S_p$ includes $T_{q\_p}$ words and is represented as $w_{q\_p}$ = $\{w_{q\_p,1}, w_{q\_p,2}, \ldots, w_{q\_p,T_{q\_p}}\}$. Note that it is assumed to be t=1, 2, . . . , $T_{q\_p}$, and $w_{q\_p,t}$ means a t-th word included in the word sequence $w_{q\_p}$ of the $q_p$-th learning speech recognition result candidate.

The set $S_p$ is, for example, the following set.
(1) A Method for Inputting One Speech Recognition Result Candidate The word sequence of one learning speech recognition result candidate is selected from word sequences of a plurality of learning speech recognition result candidates for one piece of audio data. The set $S_p$ is a set of the selected word sequence and the word sequence of the correct text ($Q_p$=1), learning is performed targeting the word sequence of the correct text. That is, only one word sequence of the learning speech recognition result candidate is used for learning among the word sequences of the plurality of learning speech recognition result candidates. For example, a method using the word sequence of the learning speech recognition result candidate whose speech recognition score $S_{ASR}$ is the highest or the word sequence of the learning speech recognition result candidate whose speech recognition score $S_{ASR}$ is the lowest is considered.
(2) A Method for Separately Inputting a Plurality of Speech Recognition Result Candidates Word sequences of L learning speech recognition result candidates are selected from word sequences of J learning speech recognition result candidates for one piece of audio data, a set $S_p$ is a set of one of the word sequences of the selected L learning speech recognition result candidates and the word sequence of the correct text ($Q_p$=1), and learning is performed targeting the word sequence of the correct text. For all the word sequences of the L learning speech recognition result candidates, a set of each word sequence and the word sequence of the correct text is made and learning is performed. Different from the above-described (1), the L word sequences of the learning speech recognition result candidates are used for learning among the word sequences of the J learning speech recognition result candidates. Note that J indicates the number of all the learning speech recognition result candidates estimated for one piece of audio data and L is any integer of one or more and J or less. For example, the word sequences of the L learning speech recognition result candidates are selected in descending or ascending order by speech recognition score $S_{ASR}$.
(3) A Method for Inputting a Plurality of Speech Recognition Result Candidates Together Word sequences of L learning speech recognition result candidates are selected from word sequences of J learning speech recognition result candidates for one piece of audio data, a set $S_p$ is a set of all the word sequences of the selected L learning speech recognition result candidates and the word sequence of the correct text ($Q_p$=L), and learning is performed targeting the word sequence of the correct text. Different from the above-described (2), the set $S_p$ is made a set of all the word sequences of the selected L learning speech recognition result candidates and the word sequence of the correct text. A method for selecting word sequences of L learning speech recognition result candidates is the same as (2). For example, as the word sequences of the L learning speech recognition result candidates, a set of a plurality of speech recognition result candidates such as a confusion network is used.

For example, the learning part 210 includes a speech recognition result candidate word distributed representation sequence conversion part 211, a speech recognition result candidate distributed representation sequence conversion part 212, and a model learning part 213.
(Speech Recognition Result Candidate Word Distributed Representation Sequence Conversion Part 211)
Input: P sets $S_p$ (one set $S_p$ includes the word sequences $w_{q\_p}$ of $Q_p$ learning speech recognition result candidates and the word sequence of one correct text)
Output: P sets $R_p$ (one set $R_p$ includes word distributed representation sequences $E_{q\_p}$ of the $Q_p$ learning speech recognition result candidates and a word distributed representation sequence of the one correct text)

The speech recognition result candidate word distributed representation sequence conversion part 211 calculates a word distributed representation of the learning speech recognition result candidate of the t-th word $w_{q\_p,t}$ in the $q_p$-th word sequence $w_{q\_p}$ of the word sequence of the $Q_p$ learning speech recognition result candidates included in the p-th set $S_p$ of the P sets as follows.

$$E_{q\_p,t} = \text{EMBEDDING}(w_{q\_p,t})$$

Here, $E_{q\_p,t}$ is a distributed representation of the word $w_{q\_p,t}$. The same processing is performed for all the words $w_{q\_p,t}$ in the learning speech recognition result candidate word sequence $w_{q\_p}$.

The speech recognition result candidate word distributed representation sequence conversion part 211 performs the above processing for the word sequences $w_{q\_p}$ of the $Q_p$ speech recognition result candidates and obtains word distributed representation sequences $E_{q\_}$ of the $Q_p$ speech recognition result candidates. Note that the word distributed representation sequence composed of $T_{q\_p}$ word distributed representations $E_{q\_p,t}$ is represented as $E_{q\_p} = \{E_{n,1}, E_{n,2}, \ldots, E_{n,T\_q\_p}\}$.

The speech recognition result candidate word distributed representation sequence conversion part 211 performs the same processing performed for the learning speech recognition result candidate word sequence $w_{q\_p}$ for the word sequence of the one correct text and obtains the word distributed representation sequence of the correct text.

The speech recognition result candidate word distributed representation sequence conversion part 211 further performs the same processing for all the P sets $S_p$.

(Speech Recognition Result Candidate Distributed Representation Sequence Conversion Part 212)
Input: the word distributed representation sequences $E_{q\_p}$ of the P speech recognition result candidates
Output: distributed representations $C_{q\_p}$ of the P speech recognition result candidates The speech recognition result candidate distributed representation sequence conversion part 212 converts the word distributed representation sequence $E_{q\_p}$ obtained by the speech recognition result candidate word distributed representation sequence conversion part 211 into one distributed representation $C_{q\_p}$. The distributed representation of the speech recognition result candidate is calculated as follows.

$$C_{q\_p} = \text{RNN}(E_{q\_p,1}, E_{q\_p,2}, \ldots, E_{q\_p,T\_q\_p})$$

Here, $C_{q\_p}$ is a continuous value vector obtained by converting the word sequence $w_{q\_p}$ of the speech recognition result candidate by the RNN.

The above processing is performed for the word distributed representation sequences $E_{q\_p}$ of the P speech recognition result candidates, and the distributed representations $C_{q\_p}$ of the P speech recognition result candidates are obtained.

(Model Learning Part 213)
Input: the distributed representations C of the P speech recognition result candidates and the word distributed representation sequence of the one correct text
Output: an error correction model The model learning part 213 uses a set of the distributed representations $C_{q\_p}$ of the P speech recognition result candidates and the word distributed representation sequence of the correct text to learn an error correction model. The error correction model includes a neural network. For example, it includes the RNN. For example, by using the distributed representation $C_{q\_p}$ of the speech recognition result candidate, a model parameter of the error correction model is updated so that the error correction score for the word distributed representation sequence of each word of the correct text becomes higher.

The weight $\lambda$ of the error correction scores $S_{error,n}$ used by the speech recognition result candidate ranking part 120 is adjusted by dividing data into data for learning and data for verification and using the data for verification. For example, $\lambda$ is changed by 0.1, and $\lambda$ at the highest speech recognition accuracy of the data for verification is used at the time of evaluation.

<Modification>
Although in the embodiment the word sequence of the speech recognition result candidate is used as an input both at the time of ranking and at the time of learning, audio data is used as an input and an unshown speech recognition part may perform speech recognition processing, and obtain the word sequence (furthermore the speech recognition score according to need) of the speech recognition result candidate. The unshown speech recognition part may be any as long as it can obtain the word sequence (furthermore the speech recognition score according to need) of the speech recognition result candidate from the audio data.

<Other Modification>
The present invention is not limited to the above-described embodiment and modifications. For example, the various processes described above may be performed not only in chronological order according to the description, but also in parallel or individually according to processing capability of an apparatus that performs the processes or according to need. In addition, modifications can be made as appropriate without departing from the spirit of the present invention.

<Program and Recording Medium>
Various processing functions in each apparatus described in the above embodiment and modifications may be implemented by a computer. In that case, processing contents of functions which each apparatus should include are described by a program. Then, the program is executed by the computer, and thereby the various processing functions in each apparatus are implemented on the computer.

The program describing the processing contents can be recorded in a computer-readable recording medium. The computer-readable recording medium may be any recording medium, for example, a magnetic recording apparatus, an optical disk, a magneto-optical recording medium, and a semiconductor memory.

Distribution of this program is carried out, for example, by selling, transferring, or lending a portable recording medium such as a DVD or a CD-ROM on which the program is recorded. Furthermore, the program may be stored in a storage apparatus of a server computer, transferred from the server computer to another computer via a network, and thereby distributed.

A computer that executes such a program, for example, first stores the program recorded on the portable recording medium or the program transferred from the server computer temporarily in its own storage part. Then, when performing processing, the computer reads the program stored in its own storage part and performs processing according to the read program. As another execution form of the program, the computer may directly read the program from the portable recording medium, and perform the processing according to the program. Furthermore, every time a program is transferred from the server computer to the computer, the computer may sequentially execute processing according to the received program. In addition, the above-described processing may be performed by the so-called ASP (Application Service Provider) type service that implements a processing function only by execution instructions and result acquisition, without transferring the program from the server computer to the computer. Note that the program includes information which is used for processing by the computer and is similar to the program (data or the like that is not a direct command to the computer but has a property that defines processing of the computer).

Each apparatus is configured by executing the predetermined program on the computer, but at least a part of the processing contents may be implemented by hardware.

What is claimed is:

1. A learning apparatus comprising:
    processing circuitry configured to
        learn an error correction model by a set of a speech recognition result candidate and a correct text of speech recognition for given audio data,
    wherein the speech recognition result candidate includes a speech recognition result candidate which is different from the correct text, and the error correction model is a model that receives a word sequence of the speech recognition result candidate as input and outputs an error correction score indicating likelihood of the word sequence of the speech recognition result candidate in consideration of a speech recognition error, and
    the processing circuitry learns the error correction model using a set of distributed representations of speech recognition result candidates and word distributed representation sequences of the correct text.

2. The learning apparatus according to claim 1,
    wherein the set of the speech recognition result candidate and the correct text used for learning the error correction model is composed of a plurality of speech recognition result candidates and one correct text.

3. A non-transitory computer-readable recording medium that records a program for causing a computer to function as the learning apparatus according to claim 1 or 2.

4. A speech recognition rank estimating apparatus, using an error correction model learned by a learning apparatus, comprising:
    processing circuitry configured to
        input word distributed representation sequences for word sequences of speech recognition result candidates and distributed representations of the speech recognition result candidates into the error correction model, and finds error correction scores, which are outputs of the error correction model, for respective word sequences of the speech recognition result candidates; and
        rank the speech recognition result candidates using the error correction scores,
    wherein the learning apparatus learns an error correction model by a set of a speech recognition result candidate and a correct text of speech recognition for given audio data, and the speech recognition result candidate includes a speech recognition result candidate which is different from the correct text, and the error correction model is a model that receives a word sequence of the speech recognition result candidate as input and outputs an error correction score indicating likelihood of the word sequence of the speech recognition result candidate in consideration of a speech recognition error.

5. The speech recognition rank estimating apparatus according to claim 4,
    wherein the processing circuitry ranks the speech recognition result candidates using scores calculated by weighting and adding speech recognition scores for respective word sequences of the speech recognition result candidates and the error correction scores.

6. A non-transitory computer-readable recording medium that records a program for causing a computer to function as the speech recognition rank estimating apparatus according to claim 5.

7. A learning method comprising:
    learning an error correction model by a set of a speech recognition result candidate and a correct text of speech recognition for given audio data,
    wherein the speech recognition result candidate includes a speech recognition result candidate which is different from the correct text, and the error correction model is a model that receives a word sequence of the speech recognition result candidate as input and outputs an error correction score indicating likelihood of the word sequence of the speech recognition result candidate in consideration of a speech recognition error, and
    the learning further includes learning the error correction model using a set of distributed representations of speech recognition result candidates and word distributed representation sequences of the correct text.

8. The learning method according to claim 7,
    wherein the set of the speech recognition result candidate and the correct text used for learning the error correction model is composed of a plurality of speech recognition result candidates and one correct text.

9. A method comprising:
    learning an error correction model by a set of a speech recognition result candidate and a correct text of speech recognition for given audio data,
    wherein the speech recognition result candidate includes a speech recognition result candidate which is different from the correct text, and the error correction model is a model that receives a word sequence of the speech recognition result candidate as input and outputs an error correction score indicating likelihood of the word sequence of the speech recognition result candidate in consideration of a speech recognition error,
    the method further comprising:
    inputting word distributed representation sequences for word sequences of speech recognition result candidates and distributed representations of the speech recognition result candidates into the error correction model, and finding error correction scores, which are outputs of the error correction model, for respective word sequences of the speech recognition result candidates; and
    ranking the speech recognition result candidates using the error correction scores.

* * * * *